F. R. BARKER.
DEMOUNTABLE RIM.
APPLICATION FILED AUG. 19, 1910.

1,004,966.

Patented Oct. 3, 1911.

Witnesses:
Sydney E. Taft.
Franklin E. Low.

Inventor:
Frederic R. Barker.
by his attorney

UNITED STATES PATENT OFFICE.

FREDERIC R. BARKER, OF BOSTON, MASSACHUSETTS.

DEMOUNTABLE RIM.

1,004,966.     Specification of Letters Patent.     Patented Oct. 3, 1911.

Application filed August 19, 1910. Serial No. 578,045.

*To all whom it may concern:*

Be it known that I, FREDERIC R. BARKER, a subject of King George V of England, residing at Boston, in the county of Suffolk and State of Massachusetts, have invented new and useful Improvements in Demountable Rims, of which the following is a specification.

This invention relates to improvements in demountable rims for vehicle wheels and is of that class used particularly in connection with pneumatic tires.

In the use of devices of this class, it is customary to carry a spare rim and tire with the tire inflated on the rim ready for use and if a tire on the vehicle becomes punctured or otherwise rendered unfit for use it is removed together with its rim and the spare rim and tire are substituted for it. This is supposed to effect a saving in time and trouble as compared with the removal of the punctured tire from the rim and substituting a new inner tube for the punctured one and replacing the tire on the rim, as before. However, demountable rims as heretofore constructed have been provided with fastening devices whose nature is such that it takes considerable time to remove the rim and tire and replace them by the spare rim and tire, and it is the object of my invention to provide a demountable rim having means for attaching the same to the wheel whereby the rim may be removed from the wheel and replaced by another with great rapidity and facility and to this end my invention consists in the novel features of construction and in the combination and arrangement of parts set forth in the following specification and particularly pointed out in the claims.

Figure 1:
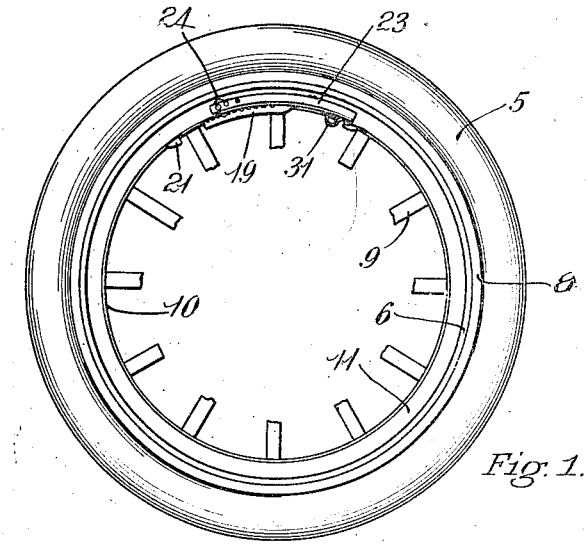
Figure 3:
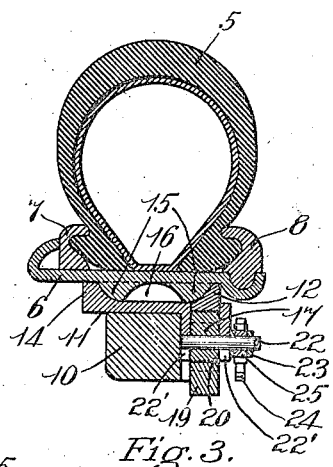
Figure 2:
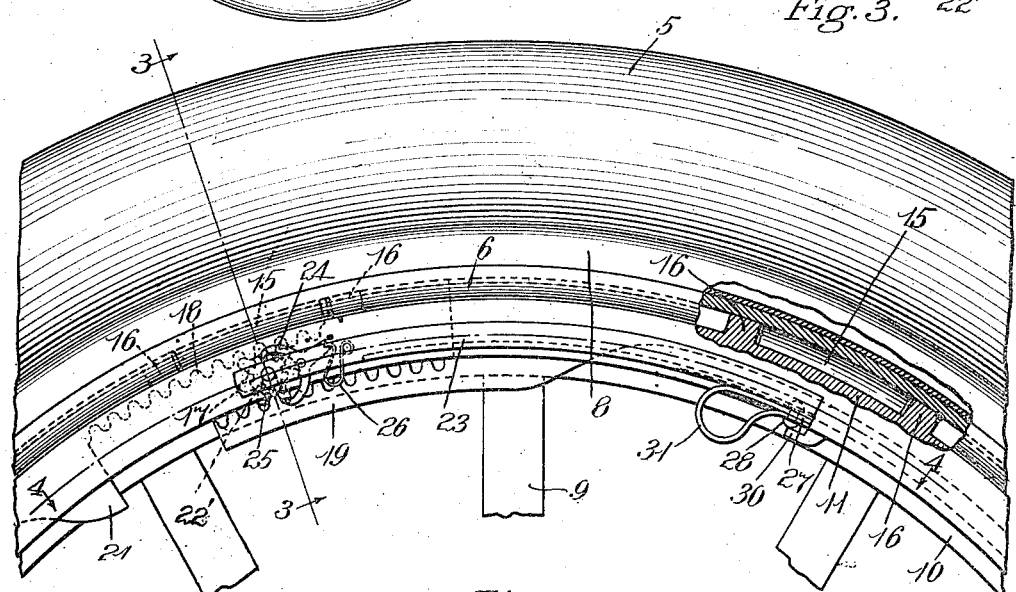
Figure 4:
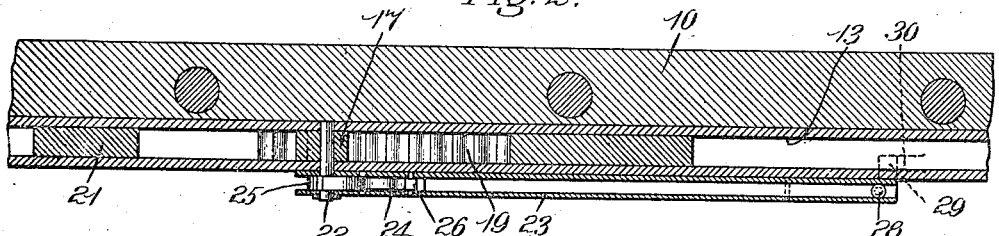

Referring to the drawing: Figure 1 is a side elevation of a demountable rim embodying my invention showing the same in connection with a wheel and tire, the hub and part of the spokes of the wheel being partly broken away. Fig. 2 is an enlarged side elevation of a portion of the wheel, rim and tire showing the fastening device. Fig. 3 is a sectional view taken on line 3—3 of Fig. 2, looking toward the right. Fig. 4 is a sectional view taken on line 4—4 of Fig. 2, looking in the direction of the arrows on said line.

Like numerals refer to like parts throughout the several views of the drawing.

In the drawing, 5 is a tire which may be of any usual or desired construction secured to a rim 6 in any usual or desired manner as, for example, by means of beads 7 and 8. The rim 6 is mounted on a wheel 9 in any usual or desired manner and which, in this instance, comprises a felly 10 having on its periphery a ring 11 secured thereto in any desired manner. To this ring the rim 6 is secured by radially movable means engaging the rim and consisting of an interrupted ring 12 which is circumferentially expansible and contractible and is preferably elastic and tends to diminish in diameter when released. The ring 11 is preferably provided with a circumferential groove 13 which receives the ring 12, said groove being of sufficient depth to allow the ring 12 to expand and contract radially and circumferentially therein to a considerable extent.

The ring 12 may engage the rim 6 in any suitable manner to prevent said rim from being laterally displaced on the ring 11 and for this purpose the ring 11 is provided on one side with an annular flange 14, while on the other side is located the ring 12, and the rim 6 is provided with a suitable projection or projections located between said flange and said ring 12 and interengaging therewith so as to be normally prevented from becoming displaced laterally. Preferably, the rim 6 and ring 11 are also provided with interengaging means for preventing said rim from rotating on said ring, such means preferably consisting of a series of lugs 15 projecting inwardly from the rim and located between lugs 16 provided on the ring 11 between the flange 14 and the ring 12, the projections 15 also serving to engage the inner faces of the flange 14 and ring 12 to prevent lateral displacement of the rim 6.

The ring 12 is expanded and contracted so as to be engaged with and disengaged from the rim 6 by any suitable means and for this purpose I preferably provide a pinion gear 17 meshing at diametrically opposite points with two racks 18 and 19 formed on or secured or otherwise connected to the ring 12 and being preferably integral therewith. To admit the rack 19, the ring 11 is preferably provided with a slot 20 of suitable extent formed by cutting away the metal at the bottom of the groove 13 at the proper point, as shown particularly in Fig. 3, and into this slot a lug 21 formed on the ring 12 also projects.

The gear 17 is secured to a shaft 22 journaled in radial slots 22' provided in the ring 11 at each side of the groove 13, as shown in Figs. 3 and 4, said slots permitting said gear to move radially as the ring 12 expands and contracts radially. To this shaft, I connect suitable means for imparting rotation to the gear 17 thereby to move the racks 18 and 19 oppositely in order to expand and contract the ring 12 and for this purpose I preferably employ a lever 23 constituting a pawl carrier journaled on the shaft 22 and having mounted thereon a double acting pawl 24 engaging a suitable ratchet 25 secured to the shaft 22, said pawl being held in engagement with one side or the other of said ratchet by means of a suitable spring 26. The lever 23 is preferably formed concentric with the rim and other circumferential parts of the wheel, as shown.

In order to expand or contract the ring 12, the pawl 24 is set in the proper position in engagement with the ratchet 25 and the lever 23 is then swung in the proper direction to cause the gear 17 to be rotated, thus imparting a relative longitudinal movement to the racks 18 and 19. It will be evident that the ring 12 requires some means to normally lock the same against contraction so that the rim will be firmly locked in place and to this end, I provide any suitable means connected thereto and which, in the present instance, consists of a locking member 27 mounted upon a pivot 28 on the lever 23 and provided with an inwardly projecting lug 29 interengaging with a suitable lug 30 provided on the inner periphery of the ring 14, said member being preferably provided with an eye 31 normally extending longitudinally of the lever 23.

To free the projection 29 from the lug 30, the operator grasps the eye 31, preferably by inserting his finger through the same, and swings the member 27 outwardly through an angle of 90°, thus completely disengaging the projection 29 from the lug 30. The lever 23 may then be swung downwardly and toward the left to a sufficient extent to contract the ring 12 until its periphery is either below or flush with the top of the groove 13, whereupon the rim 6 may be removed by sliding the same laterally toward the right, Fig. 3, carrying the tire with it. The rim and tire thus removed will then be replaced by another identical therewith and secured in place by a reversal of the foregoing operation. When the ring 12 is thus expanded it very forcibly engages the inner periphery of the rim 6 and not only prevents the same from becoming displaced laterally, but prevents any rattling.

Having thus described my invention, what I claim and desire by Letters Patent to secure is:

1. The combination with a wheel, of a rim, a gear, a pair of racks oppositely meshing with said gear, means operated by said racks for securing said rim to said wheel, a ratchet connected to said gear, a pawl engaging said ratchet, a lever on which said pawl is mounted to move relative to said lever and bodily with respect to said ratchet, and means to normally lock said lever.

2. The combination with a wheel, of a rim, a gear having a shaft, a pair of racks oppositely meshing with said gear, means operated by said racks for securing said rim to said wheel, a ratchet secured to said shaft, a lever pivoted on said shaft, a pawl mounted on said lever and engaging said ratchet, and means to normally lock said lever.

3. The combination with a wheel, of a rim, a gear having a shaft, a pair of racks oppositely meshing with said gear, means operated by said racks for securing said rim to said wheel, a ratchet secured to said shaft, a lever pivoted on said shaft and having a pair of arms between which said ratchet is located, a pawl mounted on said lever between said arms and engaging said ratchet, and means to normally lock said lever.

In testimony whereof I have hereunto set my hand in presence of two subscribing witnesses.

FREDERIC R. BARKER.

Witnesses:
 LOUIS A. JONES,
 SYDNEY E. TAFT.